US010256861B2

(12) United States Patent
Burns

(10) Patent No.: US 10,256,861 B2
(45) Date of Patent: Apr. 9, 2019

(54) FLOATABLE CELL PHONE CASE

(71) Applicant: Nicole Elizabeth Burns, Oviedo, FL (US)

(72) Inventor: Nicole Elizabeth Burns, Oviedo, FL (US)

(*) Notice: Subject to any disclaimer, the term of this patent is extended or adjusted under 35 U.S.C. 154(b) by 0 days.

(21) Appl. No.: 15/871,722

(22) Filed: Jan. 15, 2018

(65) Prior Publication Data
US 2018/0212640 A1    Jul. 26, 2018

Related U.S. Application Data

(60) Provisional application No. 62/449,369, filed on Jan. 23, 2017.

(51) Int. Cl.
H04B 1/3888   (2015.01)
A45C 13/00    (2006.01)
A45C 11/22    (2006.01)
A45C 15/06    (2006.01)
A45C 11/00    (2006.01)

(52) U.S. Cl.
CPC ............ H04B 1/3888 (2013.01); A45C 11/22 (2013.01); A45C 13/008 (2013.01); A45C 15/06 (2013.01); A45C 2011/002 (2013.01); A45C 2011/003 (2013.01)

(58) Field of Classification Search
CPC combination set(s) only.
See application file for complete search history.

(56) References Cited

U.S. PATENT DOCUMENTS

| 6,252,525 | B1* | 6/2001 | Philiben ............... G01S 1/70 340/961 |
| 6,785,566 | B1 | 8/2004 | Irizarry |
| 7,173,648 | B1* | 2/2007 | Phan ................. G01N 21/8803 348/87 |
| 8,295,896 | B2 | 10/2012 | Jeon |
| 8,311,595 | B2 | 11/2012 | Takatsuka et al. |
| 8,399,764 | B2 | 3/2013 | Klosky |
| 2008/0152510 | A1* | 6/2008 | Krumme ............. F04B 43/02 417/300 |
| 2012/0074154 | A1* | 3/2012 | Ming Ki Gordon ....... A47G 21/182 220/705 |
| 2013/0193006 | A1* | 8/2013 | Bergreen ............. A45C 11/22 206/37 |
| 2014/0248339 | A1 | 9/2014 | Chung et al. |
| 2015/0201723 | A1* | 7/2015 | Rayner ............... G06F 1/1601 224/191 |

(Continued)

Primary Examiner — Cindy Trandai
(74) Attorney, Agent, or Firm — Mark C. Johnson; Johnson |Dalal

(57) ABSTRACT

A floatable cell phone case floats, with a cell phone or other electronic device housed therein, on a liquid through use of enclosed polygonal units that define a polygonal air volume. The polygonal units form a seal with the cell phone to create buoyancy. The cell phone case comprises case body having a rear wall and enclosed sidewalls having a flange. The rear wall and sidewalls define a device placement zone. The device placement zone is sized to house the cell phone. The flange retains the cell phone within the device placement zone. The phone case further comprises enclosed polygonal units spanning upwardly from an inner surface of the rear wall into the device placement zone. Each of the polygonal units define a polygonal air volume.

20 Claims, 5 Drawing Sheets

(56) References Cited

U.S. PATENT DOCUMENTS

| | | | |
|---|---|---|---|
| 2016/0013828 A1* | 1/2016 | Pan .................. | H04B 1/385 455/575.6 |
| 2016/0096949 A1* | 4/2016 | Evans ................ | C08K 3/04 521/122 |
| 2017/0119098 A1* | 5/2017 | Kramer .............. | A43B 17/08 |

* cited by examiner

FLOATABLE CELL PHONE CASE

CROSS-REFERENCE TO RELATED APPLICATION

This application claims priority to U.S. Provisional Patent Application No. 62/449,369 filed Jan. 23, 2017, the entirety of which is incorporated herein by reference.

FIELD OF THE INVENTION

The present invention relates generally to carrying cases for mobile phones, and, more particularly, relates to carrying cases that float, with a cell phone or other electronic device housed therein.

BACKGROUND OF THE INVENTION

It is known that a cellular phone is a wireless telephone that utilizes a system of low-powered radio transmitters, with each transmitter covering a distinct geographical area and computer equipment to switch a call from one area to another, thus enabling broad-scale portable phone service. The cellular phone often combines communication, digital photography, and video game functions, PDA, and video game functions.

Typically, cellular phone users carry their respective cellular phone with them wherever they go, at work, play, and even at home. Like many other utilitarian devices, cell phones have become a fashion statement, i.e., a reflection of the user's personality. This is exemplified by the vast array of available colors, styles, feature options, ring tones, and accessories that can be purchased. One common type of accessory is a cell phone case, which serves as a protective cover. The cell phone case is often provided for cellular phones to reduce the possibility of damaging the cellular phone from inadvertent contact with liquids, inadvertent drops, corrosion in high humidity environments, etc.

Often, the cell phone case is not water resistant, very dense, or otherwise sealed to prevent damage to the sensitive electronics that make up the cellular phone. Hence, accidents such as submersion of the cellular phone in water at a pool or at a beach are common place, and these accidents may end up rendering the cellular phone unusable or irretrievable. Moreover, the outer surfaces of the cellular phone are often made from materials that can be easily scratched. Furthermore, the cellular phone is often carried by hand or retained in a garment pocket, which increases the risk of the cellular phone falling into a body of water or shock damage from hitting a hard surface.

Therefore, a need exists to overcome the problems with the prior art as discussed above.

SUMMARY OF THE INVENTION

The invention provides a floatable cell-phone case that overcomes the hereinafore-mentioned disadvantages of the heretofore-known devices and methods of this general type and that is capable of floating, with a cell phone or other electronic device housed therein, on a body of water, such as the ocean or in a pool. The case also provides shock protection from dropping on hard surfaces via the deformably resilient material employed by the case. Specifically, the cell phone case house may be constructed from a low-density open cell material to ensure that the housing and received cell phone remain on the surface of the water. Further, the housing may include a light assembly having a light source configured to activate when the case senses contact with a liquid, or a body of water. In one embodiment, the light source may activate and deactivate to form a strobe lighting pattern, thus increasing the visibility of the device, especially in low-light or limited visibility situations.

With the foregoing and other objects in view, there is provided, in accordance with the invention, a floatable cell phone case comprising a flexible case body. The case body comprises a rear wall and a plurality of enclosed sidewalls having a flange coupled to the distal end thereto. The rear wall and the plurality of enclosed sidewalls define a device placement zone. The device placement zone is sized to house a cell phone or a standard-sized portable electronic device. The flange is operably configured to retain the electronic device within the device placement zone.

The floatable cell phone case further comprises a plurality of enclosed polygonal units spanning upwardly from an inner surface of the rear wall into the device placement zone. The enclosed polygonal units are disposed the substantial entirety of the rear wall. Each of the plurality of enclosed polygonal units respectively forms a polygonal air volume, creating airtight hollow structures designed to provide buoyancy for the case body in a liquid or body of water.

In one non-limiting embodiment, the floatable cell phone case comprises a light assembly having a light source. The light source activates when the case senses contact with a liquid. The light source may activate and deactivate to form a strobe lighting pattern.

In accordance with a further feature of the present invention, the case body is configured with an overmold.

In accordance with a further feature of the present invention, the case body is fabricated from polypropylene, a polyethylene, silicone, or a deformably resilient material. The material may also have antimicrobial and heat resistant properties or additives.

In accordance with another feature, the enclosed sidewalls of the case body are defined by at least one aperture to enable passage and access for wires, USB, sockets, speakers, and fasteners.

In accordance with yet another feature, the portable electronic device may include a cellular phone, a smart phone, a tablet, and a laptop.

In accordance with a further feature of the present invention, the polygonal units are disposed along at least 95% of the rear wall of the case body.

In accordance with a further feature of the present invention, the polygonal units form a seal with the portable electronic device.

In accordance with a further feature of the present invention, the polygonal units comprise hexagonally enclosed units.

In accordance with a further feature of the present invention, the enclosed polygonal units form airtight hollow polygonal structures designed to provide buoyancy in a liquid or body of water.

In accordance with a further feature of the present invention, the polygonal units comprise a low-density open cell material.

In accordance with a further feature of the present invention, the polygonal units are fabricated from silicone.

In accordance with a further feature of the present invention, the polygonal units are deformable.

In accordance with a further feature of the present invention, the generally polygonal shape of the polygonal units enhances floatability of the case body.

One objective of the present invention is to provide a phone case that securely receives a cell phone or other electronic device, and is capable of floating, with the cell phone housed therein, on a body of water, such as the ocean, toilet, sink, or in a pool.

Another objective is to provide a plurality of enclosed polygonal units that form a polygonal air volume to create buoyancy for the phone case.

Another objective is to provide a cell phone case that provides shock protection from dropping on hard surfaces via the deformably resilient material employed by the case.

Another objective is to provide a light source that activates and deactivates to form a strobe lighting pattern, so as to increase the visibility of the device, especially in low-light or limited visibility situations Another objective is to provide a cell phone case house constructed from a low-density open cell material to ensure that the housing and received mobile electronic device remain on the surface of the water.

Another objective is to integrate a light assembly into the case body, such that the light assembly comprises a light source configured to activate when the case senses contact with said body of water.

Another objective is to provide an inexpensive to manufacture cell phone case.

Although the invention is illustrated and described herein as embodied in a floatable cell phone case, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cover and/or electronic device or other tangible item housed therein.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
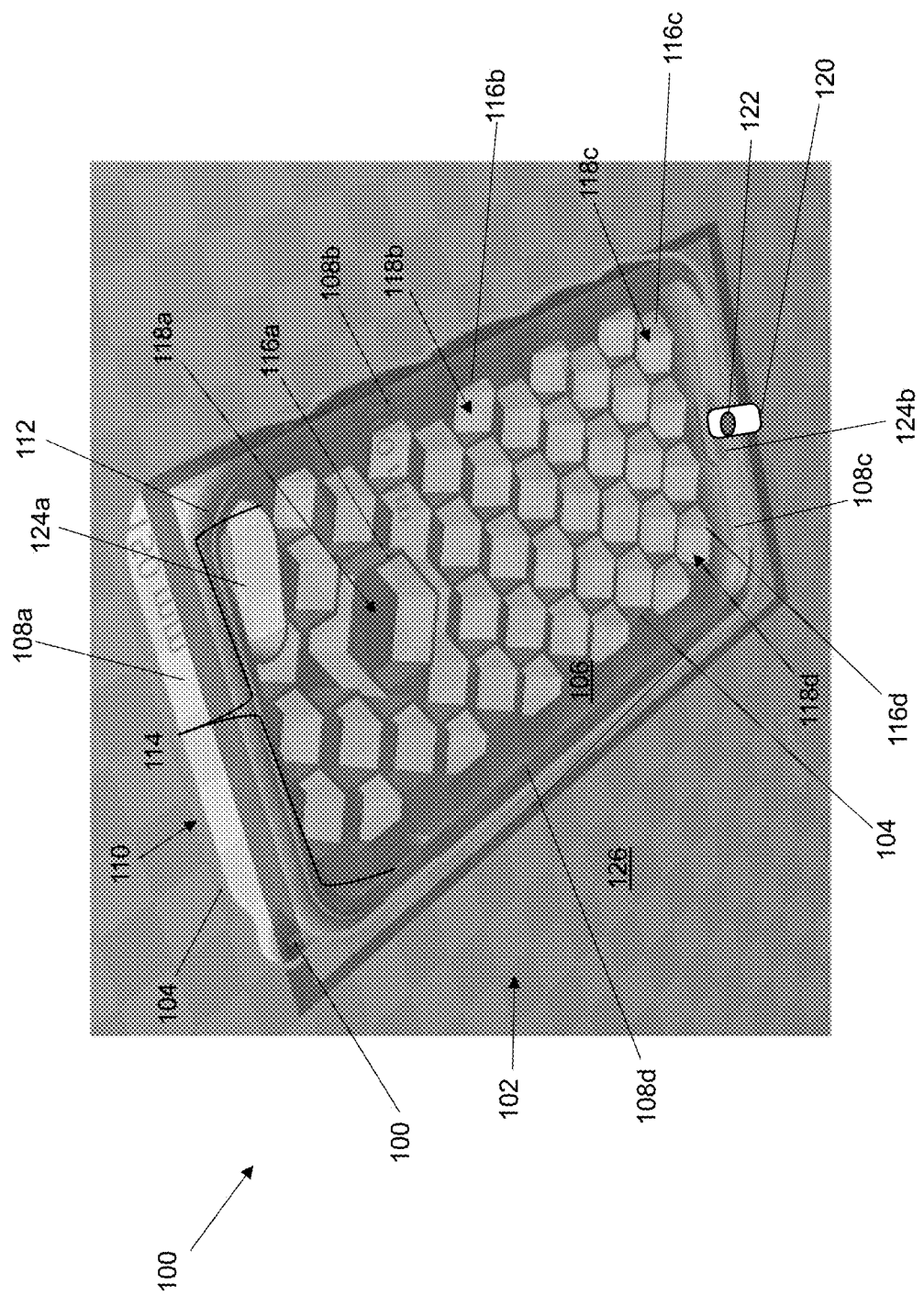
FIG. 1 is an isometric view of a floatable cell phone case, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient floatable cell phone case 100 that is configured to float, with a cell phone (not shown) or other electronic device housed therein, on a liquid 126 or body of water through use of enclosed polygonal units 116a-n that each respectively define a polygonal air volume 118a-n, wherein the letter "n" represents any number greater than one. The enclosed polygonal units 116a-n form airtight hollow structures designed to provide buoyancy for the case body 102 in a liquid 126 or body of water. In one embodiment, the polygonal units 116a-n and corresponding air volumes 118a-n may be hexagons, while in other embodiments they may be heptagons or rectangular.

Embodiments of the invention provide a case body 102 having a rear wall 104 and enclosed sidewalls 108a-d having a flange 112. The rear wall 104 and sidewalls define a device placement zone 114. The device placement zone 114 is sized to house the cell phone. The flange 112 retains the cell phone within the device placement zone 114. In addition, embodiments of the invention provide enclosed polygonal units 116a-n spanning upwardly from an inner surface 106 of the rear wall 104 into the device placement zone 114. Each of the polygonal units 116a-n define a polygonal air volume 118a-n. The cell phone case 100 further comprises a light assembly 120 having a light source 122 that activates when the case senses contact with a liquid 126.

Referring now to FIG. 1, one embodiment of the present invention is shown in an isometric view. FIG. 1 shows several advantageous features of the present invention, but, as will be described below, the invention can be provided in several shapes, sizes, combinations of features and components, and varying numbers and functions of the components.

The first example of a floatable cell phone case 100, as shown in FIG. 1, includes a flexible case body 102 that is configured to encapsulate and securely retain a cell phone or other electronic device during operation. In some embodiments, the case body 102 may be configured with an overmold. Said another way, the polygonal units 116, comprised of one material, may have superimposed thereon, during the manufacturing process, another material comprising the shell of the case body 102. In other embodiments, the shell of the case body 102 is formed first of another material, and the polygonal units 116 are superimposed and formed thereon, i.e., overmolded thereon. The case body 102 may have a generally rectangular shape that is sized and dimensioned to match the shape of a standard cell phone known in the art, e.g., approximately 6-7" in length and 3-4" in width. Though in other embodiments, the case body 102 may have other shapes, including a square, a circle, and a triangle shape, so as to encase other types of electronic devices. Suitable electronic devices may include, without limitation, a cellular phone, a tablet, and a laptop.

In some embodiments, the case body 102 is fabricated from a deformably resilient material that allows for deformability thereof. The case body 102 may also have antimicrobial and/or heat resistant or stabilizing properties and/or additives. This capacity of the case body 102 for deforming enables shock protection to the cell phone when dropped on hard surfaces. Further, the material composition of the case body 102 is generally lightweight and conducive to floatation; not being heavy like metal or wood. Suitable materials for the case body 102 may include, without limitation, polypropylene, polyethylene, silicone, and rubber.

Figure 2:
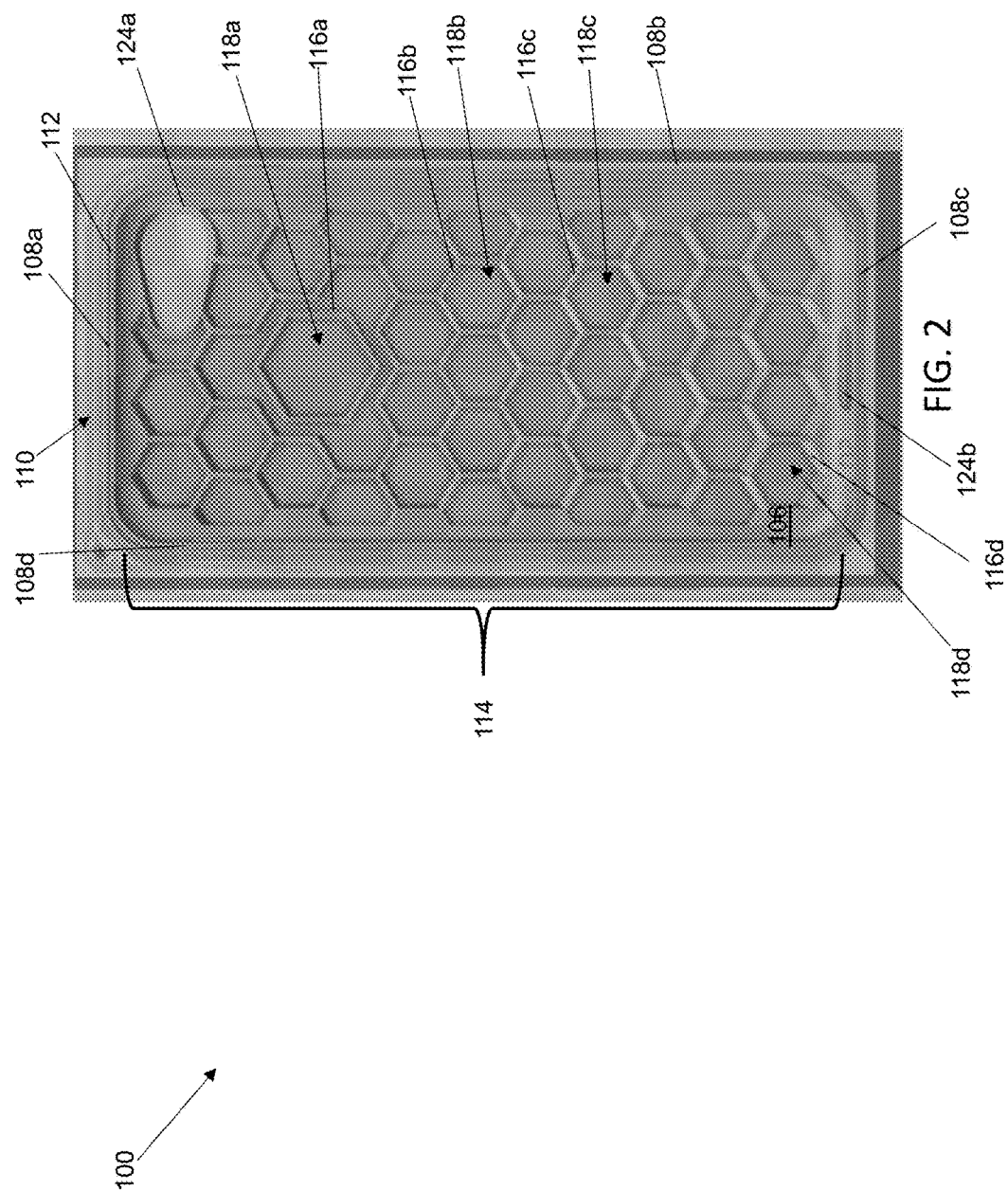
FIG. 2 is a top plan view of a floatable cell phone case, showing the inner surface and a plurality of enclosed polygonal units, in accordance with the present invention.

Turning now to FIG. 2, the case body 102 comprises a rear wall 104 and a plurality of enclosed sidewalls 108a, 108b, 108c, 108d. The sidewalls 108a-d run around the perimeter of the rear wall 104, forming a generally perpendicular relationship to the rear wall 104. In one embodiment, two short sidewalls 108a, 108c and two long sidewalls 108b, 108d form a generally rectangular perimeter to the case body 102. The rear wall 104 and the enclosed sidewalls 108a-d define a device placement zone 114 that is sized and dimensioned to house a cell phone, or any standard-sized portable electronic device known in the art.

Figure 3:
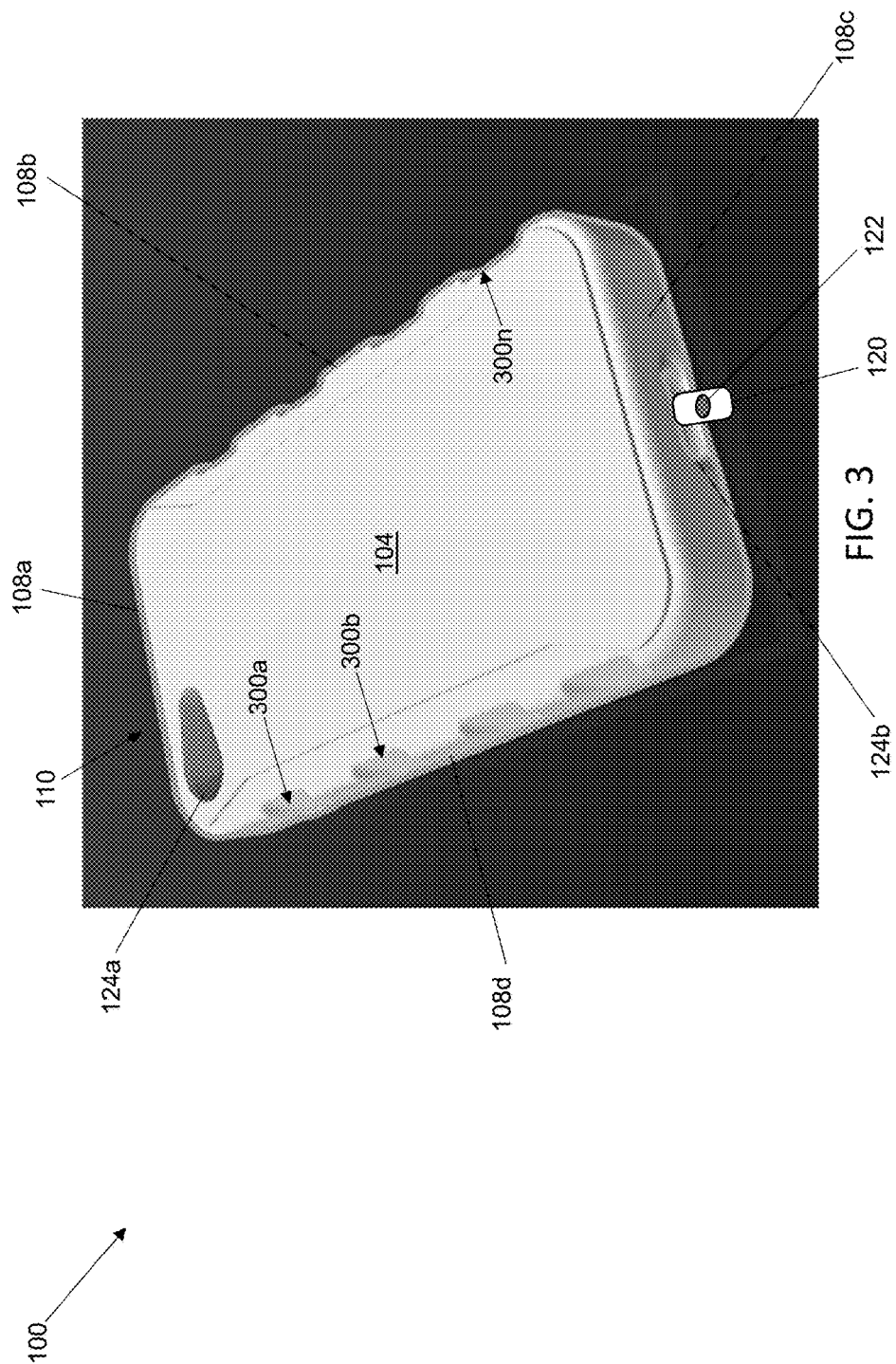
FIG. 3 is an isometric view of a rear wall of the floatable cell phone case shown in FIG. 1, in accordance with the present invention.

As discussed above, the device placement zone 114 may have various dimensions and shapes to accommodate variously sized cell phones and electronic devices. One non-limiting embodiment, shown in FIG. 3, for the device placement zone 114 includes a depth of at least ½", a length of at least 5", and a width of at least 2". Though on other embodiments, different dimensions may be used. Also depicted in FIG. 3 are a plurality of finger impressions 300a-n for generating a non-slip surface or configuration on the sides of the case body 102.

Figure 4:
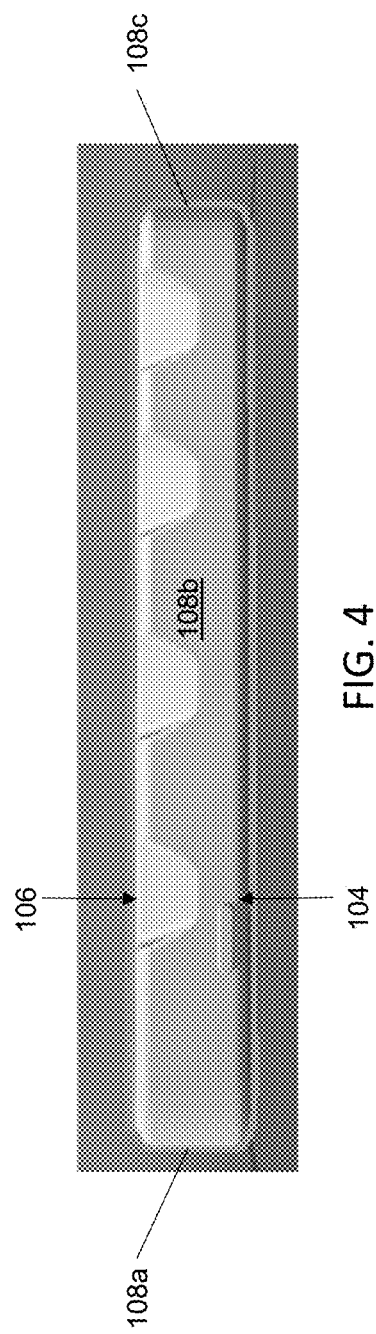
FIG. 4 is an elevated side view of the floatable cell phone case shown in FIG. 1, in accordance with the present invention.

Looking now at FIG. 4, the case body 102 is further defined by a distal end 110. The distal end 110 is one of the short ends of the case body 102. The distal end 110 comprises a flange 112 that is operably configured to retain the standard-sized portable electronic device within the device placement zone 114. In some embodiments, the flange 112 may be defined by a curved configuration configured to wrap around the edges of the cell phone, so as to securely retain the cell phone within the enclosed sidewalls 108a-d. In some embodiments, the flange 112 may run beyond the distal end 110 of the case body 102, along the entirety of the sidewalls.

In one non-limiting embodiment, the enclosed sidewalls 108a-d of the case body 102 are defined by at least one aperture 124a, 124b. The aperture 124a-b enhances functionality of the cell phone or other electronic device by enabling passage and access for wires, USB, sockets, speakers, and fasteners. FIG. 2 illustrates a large aperture 124a at the distal end 110 of the case body 102 for enabling access to a camera lens, and an oppositely disposed small aperture 124b for enabling access to a USB port, speaker, or light from a light assembly 120, as described below.

Figure 5:
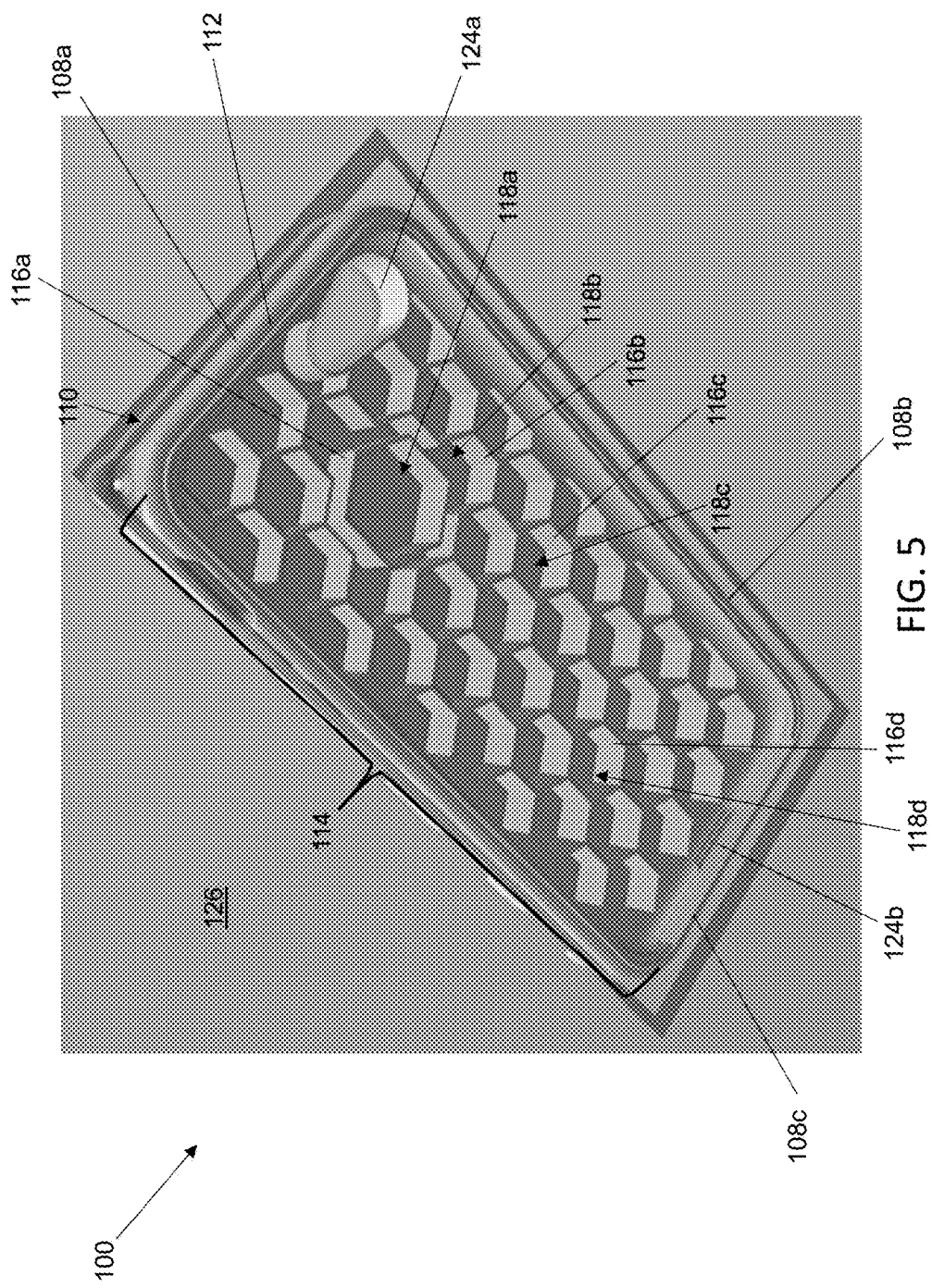
FIG. 5 is an isometric view of the floatable cell phone case shown in FIG. 1, in accordance with the present invention.

As shown in FIG. 5, one of the unique features of the floatable cell phone case 100 is its capacity to float on a liquid 126 while retaining the cell phone. This function is possible because of a plurality of enclosed polygonal units 116a-n that span upwardly from an inner surface 106 of the rear wall 104, and into the device placement zone 114. The enclosed polygonal units 116a-n are disposed the substantial entirety of the rear wall 104. In one embodiment, the enclosed polygonal units 116a-n are disposed over at least 95% of the inner surface 106 of the case body 102.

The enclosed polygonal units 116a-n are configured to enable floatation of the case body 102. The polygonal units 116a-n and/or shell may be fabricated from a low-density open-cell material, such as silicone, for example. The generally polygonal shape of the polygonal units enhances floatability of the case body. Furthermore, the deformable material construction of the polygonal units 116a-n is efficacious for protecting the phone from shocks.

As FIG. 2 illustrates, each of the enclosed polygonal units 116a-n respectively defines a polygonal air volume 118a-n or void for trapping air after the device is inserted therein to create a more buoyant case body 102. The polygonal air volume 118a-n enables the case body 102 to float, because as the surface of the cell phone presses against the enclosed polygonal units 116a-n, the enclosed polygonal units 116a-n form airtight hollow structures designed to provide buoyancy in a liquid 126 or body of water. In addition to the airtight hollow enclosed polygonal units 116a-n, the lightweight material composition of the case body 102 is inherently buoyant, contributing to the floatation of the case body 102.

Those skilled in the art will recognize that an object, such as the cell phone case 100, with less density than the liquid 126 it is submersed in, tends to float upward until it reaches the surface of the liquid 126. At that position, only part of the object is submerged. It is also known that there is an upward force on the object due to the effect of gravity at any depth in a fluid. If the density of the object in the fluid is greater than the density of the fluid, the object sinks. However, if the density is less than the fluid, the object floats. Thus, the polygonal air volume 118a-n contained in the enclosed polygonal units 116a-n reduce the density of the cell phone case 100 in relation to water, causing the cell phone case 100 to float, even with the added weight of the cell phone contained therein.

Looking back at FIGS. 1 and 3, the cell phone case 100 may also provide a light assembly 120 that emits an illumination upon contact with the liquid 126. This may help indicate if the cell phone case 100 has fallen into a body of water. Those skilled in the art will recognize that it is generally not desirable for a cell phone to be submersed in a liquid 126. Thus, the light assembly 120 provides a light source 122 that activates to generate illumination when sensing a liquid 126. Those skilled in the art will recognize that various sensors used to measure and detect liquid 126s, such as contact sensors, and liquid 126 leakage sensors, and the like, may be operatively connected to the light assembly 120 to activate upon sensing liquid 126.

In one non-limiting embodiment, the light source 122 activates and deactivates to form a strobe lighting pattern. The strobe light pattern may include colors, such as red, white, and yellow, so as to draw attention to the cell phone case 100 and cell phone contained within. In an alternative embodiment, an audio assembly may also be used to emit audio signals upon detecting a liquid 126. A power source (not shown), such as a battery or solar cell, may be used to power the light assembly 120 or the audio assembly.

A floatable cell phone case 100 has been disclosed that floats, with a cell phone housed therein, on a liquid 126 through enclosed polygonal units 116a-n that define a polygonal air volume 118a-n. The polygonal units 116a-n may form airtight polygonal structures that create buoyancy when the cell phone or other device is house therein. The cell phone case 100 comprises case body 102 having a rear wall 104 and enclosed sidewalls 108a-d having a flange 112. The rear wall 104 and sidewalls define a device placement zone 114. The device placement zone 114 is sized to house or receive the cell phone. The flange 112 retains the cell phone within the device placement zone 114. The phone case further comprises enclosed polygonal units 116a-n spanning upwardly from an inner surface 106 of the rear wall 104 into the device placement zone 114. Each of the polygonal units 116a-n define a polygonal air volume 118a-n. The cell phone case 100 further comprises a light assembly 120 having a light source 122 that activates when the case senses contact with a liquid 126.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A floatable cell phone case comprising:
   a flexible case body with:
      a rear wall and a plurality of enclosed sidewalls having a flange coupled to a distal end thereto, the rear wall and plurality of enclosed sidewalls defining a device placement zone sized to house a standard-sized portable electronic device and the flange operably configured to retain the standard-sized portable electronic device within the device placement zone; and
      a plurality of enclosed polygonal units spanning upwardly from an inner surface of the rear wall into the device placement zone and disposed the substantial entirety of the rear wall, each of the plurality of enclosed polygonal units respectively defining a polygonal air volume spatially coupled to the device placement zone.

2. The floatable cell phone case according to claim 1, wherein:
   the case body is configured with an overmold.

3. The floatable cell phone case according to claim 1, wherein:
   the case body is fabricated from polypropylene, polyethylene, or a deformably resilient material.

4. The floatable cell phone case according to claim 1, wherein:
   the enclosed sidewalls of the case body are defined by at least one aperture.

5. The floatable cell phone case according to claim 1, wherein:
   the polygonal units are disposed along about 95 percent of the rear wall of the case body.

6. The floatable cell phone case according to claim 1, wherein:
   the polygonal units form a seal with the portable electronic device.

7. The floatable cell phone case according to claim 1, wherein:
   the polygonal units comprise hexagonally enclosed units.

8. The floatable cell phone case according to claim 1, wherein:
   the polygonal units form a buoyant body.

9. The floatable cell phone case according to claim 1, wherein:
   the polygonal units comprise a low-density open cell material.

10. The floatable cell phone case according to claim 1, wherein:
    the polygonal units are fabricated from silicone or a deformably resilient material.

11. The floatable cell phone case according to claim 1, wherein:
    the polygonal units are deformable.

12. The floatable cell phone case according to claim 1, further comprising:
    a light assembly having a light source, the light source activating when the case senses contact with a liquid.

13. The floatable cell phone case according to claim 12, wherein:
    the light source activates and deactivates to form a strobe lighting pattern.

14. The floatable cell phone case according to claim 13, wherein:
    the light assembly comprises a strobe light.

15. A floatable cell phone case comprising:
    a flexible case body with:
       a rear wall and a plurality of enclosed sidewalls having a flange coupled to a distal end thereto, the enclosed sidewalls being defined by at least one aperture, the rear wall and plurality of enclosed sidewalls defining a device placement zone sized to house a standard-sized portable electronic device and the flange operably configured to retain the standard-sized portable electronic device within the device placement zone;
       a plurality of enclosed polygonal units fabricated from a deformably resilient material, the enclosed polygonal units spanning upwardly from an inner surface of the rear wall into the device placement zone and disposed the substantial entirety of the rear wall, each of the plurality of enclosed polygonal units respectively defining a polygonal air volume spatially coupled to the device placement zone; and a light assembly having a light source, the light source activating when the case senses contact with a liquid.

16. The floatable cell phone case according to claim 15, wherein:

the light source activates and deactivates to form a strobe lighting pattern.

17. The floatable cell phone case according to claim 16, wherein:

the light assembly comprises a strobe light.

18. The floatable cell phone case according to claim 15, wherein:

the polygonal units are disposed along at least 95 percent of the rear wall of the case body.

19. The floatable cell phone case according to claim 15, wherein:

the polygonal units are deformable.

20. A floatable cell phone case consisting of:

a flexible case body with:

a rear wall and a plurality of enclosed sidewalls having a flange coupled to a distal end thereto, the sidewalls being defined by at least one aperture, the rear wall and plurality of enclosed sidewalls defining a device placement zone sized to house a standard-sized portable electronic device and the flange operably configured to retain the standard-sized portable electronic device within the device placement zone, the case body being deformable, the case body being fabricated from polypropylene or polyethylene;

a plurality of enclosed polygonal units fabricated from enclosed polygonal units, the enclosed polygonal units spanning upwardly from an inner surface of the rear wall into the device placement zone and disposed along about 95 percent of the rear wall, each of the plurality of enclosed polygonal units respectively defining a polygonal air volume spatially coupled to the device placement zone, the plurality of enclosed polygonal units being fabricated from silicone; and a light assembly having a light source, the light source activating when the case senses contact with a liquid, the light source activating and deactivating to form a strobe lighting pattern.

* * * * *